Patented Sept. 17, 1946

2,407,725

UNITED STATES PATENT OFFICE 2,407,725

REFRACTORY LINING OF METALLURGICAL STRUCTURES

Robert A. Schoenlaub, Tiffin, Ohio, assignor to Basic Refractories, Inc., Cleveland, Ohio, a corporation of Ohio No Drawing. Application February 27, 1943, Serial No. 477,472

9 Claims. (Cl. 117—27)

This invention relates to the applying of basic refractories to those portions of metallurgical apparatus, furnaces, etc., desirably constructed of basic material; and more particularly it relates to the replenishing of such surfaces from time to time, even including furnaces which are hot, thus increasing furnace life and efficiency.

In basic metallurgical structures, such as open hearth furnaces, there is a gradual erosion of the bottoms, slag lines, back and front walls and bulkheads. In practice the hearths and side walls are repaired by shoveling in granular basic material. However, the more vertical portions of the structure cannot be repaired in such manner, and their gradual erosion reduces the efficiency of the furnace and shortens its life. Basic surfaces are essential in many usages. As well recognized in the art, basic linings stand in particular contrast to acid refractories. While acid refractories or clays offer no difficulty in coating-applications, because of their physical and chemical character, being plastic and sticky and successfully applied in almost any way, the opposite is true with basic refractories. Basic refractory materials are non-plastic and they inherently lack the properties of sticking to the surface to which they might be applied or even holding together per se. The great tendency to hydrate gives them a further complicating weakness also such as is not encountered in acid refractories. From a cost standpoint, basic brick linings are expensive, and advances in maintaining basic linings and lengthening their service life and avoiding losses in shut-downs for replacement have been consistently sought and desired, but basic lining repair in hot furnaces has remained ineffective because so much of the furnace surface is not accessible to the simple shoveling practice commonly used, and the basic material which has been applied has tended to spall too extensively. In accordance with the present invention all such structures can be rapidly coated with a basic surface, so that the efficiency and life of the apparatus may be increased.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

There are, as seen, many serious difficulties to be met in making repairs in basic refractory installations. Operation frequently must be carried on with the furnace at high temperature, on the order of 2500° F. for instance, and the refractory must under such conditions, impinge without being dispersed in the atmosphere or without bouncing off, and must in all cases be retained in position without popping or scaling during extremely rapid temperature increase, and the refractory must be compatible with the basic furnace substances and with any slags which are present. Basic refractories are not intrinsically adapted to meet such stringent condition. Some of them, notably dolomite, are susceptible to hydration, which causes difficulty in bonding. Also, they all lack cohesive and bonding properties which would render them easy to apply so as to remain in place. Basic refractories should also desirably contain coarse particles to control shrinkage and to give density.

By my present invention, these stringent conditions may be met, and such materials as burned dolomite, magnesite or basic ores or basic silicates or suitable combinations thereof, may be applied to a hot furnace by pneumatic application, and particles of matter coarser than have been effectively used in the previous art may be applied. Particularly my invention makes possible the attainment of low costs, as with suitable precautions inexpensive burned dolomite may be used as the bulk of the refractory, and without the usual difficulties from hydration.

The refractory material is compounded of a major part of moderately coarse matter and a minor part of moderately fine material. A typical and desirable size would comprise 51 per cent —10 +20 mesh, 25 per cent —20 +100 mesh and 24 per cent —100 mesh. If bouncing constitutes a problem in the particular application contemplated, I would use a somewhat finer size, such as 23 per cent —14 +20 mesh, 49 per cent —20 +100 mesh and 28 per cent —100 mesh. Many sizings easily available are practical for my purpose.

As I preferably make my gun refractory from cheap materials, a combination of —10 or —16 mesh hard-burned dolomite and of —100 mesh magnesite clinker is particularly desirable. The dolomite should be a hard-burned product, stabilized with roll scale, such as is used for fettling in open hearths. The material can be obtained in the desired sizing by screening from plant run of coarser hearth material. Crushing of dolomite clinker should be avoided, as this exposes surfaces which are particularly susceptible to hydration. I use with this screened dolomite a pulverized magnesia clinker, which has been stabilized against hydration by hard-burning, and added substances, such as chrome ore. I may, however, make my gun mixture of dolomite or magnesite alone, or from chrome ore, forsterite, etc., or suitable combinations thereof.

Although basic refractory mixtures do not inherently have the necessary adhesive properties to be retained when wet upon a vertical wall nor the cohesive properties to form an integrated mass, I have found that by incorporating a material which, in contact with water, will swell rapidly to a gel, the composition becomes both adhesive and cohesive. Serpentine and clays are not applicable here, for they do not swell to the required degree, and to impart cohesion and adhesion would have to be used in amounts beyond the chemical tolerance of basic refractories. Sodium silicate also does not serve this particular function, for it forms a sol and also forms a dispersed suspension rather than a gel under these conditions. The exact mechanism of action of such small amounts of added substances is not known. Apparently, however, they swell and form a resilient matrix with water, with an appreciable yield point. A particle impinging upon such a resilient mass can establish a high intimacy of contact and be thereafter retained until the permanent bonds develop.

A striking feature of my invention is the small amount of gel-forming material required for my purposes. Normally, one-half of one percent of a swelling gel-forming substance will give appreciable improvement. One or two per cent seems, in general, to be optimum. Beyond about six per cent, no further improvement in adhesion is noticed and the emplaced refractory may entrap steam, causing popping. In some cases, with large amounts of gels, the wet gelatinized material may show a plastic flow preliminary to drying. The requirement thus is enough gel-forming substance to fill the voids in an emplaced refractory when gauged with water, but not enough to seal the refractory or to cause flow. These voids usually constitute about a fifth of the volume of an emplaced refractory, neglecting the closed or body voids of refractory grains which need not be filled, and in the materials which I preferably use the swelling ratio of the dry to the wet volumes is about 1:20, therefore one per cent of the gel-forming substances should in general supply the unusual degree of adhesion and cohesion required. The amounts stated are, of course, exclusive of filler or inert adventitious matter which may be present in the gel-forming material employed.

Such gel-forming material must absorb water and swell to a voluminous form with extreme rapidity. Such swelling, in the case of bentonitic materials, may be enhanced by grinding such material into the refractory fines. This normally is adequate. Other expedients which materially aid swelling are the use of hot water or of water softened with sodium carbonate or other alkali matter. Also, the incorporation of certain sulfonated hydrocarbons seems to speed swelling. Cationic wetting agents must not be employed, as they seem to prevent the formation of the type of gel I desire.

In general, the gel-forming agent is preferably an inorganic material having properties such as of a plastic hydrous magnesium silicate. Plastic hydrous magnesian silicates may be found in natural condition in different locations. One such deposit occurs near Hector, San Bernardino County, California, and the material from this deposit will be referred to hereinafter as "hectorite." Its occurrence and composition have been described for instance in the Journal of the Mineralogical Society of America, vol. 21, page 238 (1936). Such plastic hydrous magnesian silicate has a ratio of silica to magnesia usually slightly greater than 2:1 by weight. It contains some alkali, including lithia. Hectorite freed from fine calcite occurring with it analyzes as follows: ignition loss 5.7, MgO 25.1, $SiO_2$ 57.8, $Fe_2O_3$ 0.1, $Al_2O_3$ 0.8, $Na_2O$ 2.9. An average analysis of the material in a natural state, and as in fact may be used, is as follows: ignition loss 25.55, MgO 11.09, CaO 29.28, $SiO_2$ 26.14, $Fe_2O_3$ 0.06, $Al_2O_3$ 0.36, $Na_2O$ 1.30.

Up to about 5 per cent of such plastic hydrous magnesium silicate or hectorite may be incorporated, ignoring generally calcite and impurities present in commercial deposits. Plasticity and cohesiveness is imparted in amounts up to about 2 per cent, and by the addition of amounts up to about 5 per cent of the weight of the refractory there is obtained further stickiness which is advantageous in the present usage. This plasticizing agent should be fine and well dispersed throughout the refractory material.

Hectorite seems to have many advantages over other gel-forming substances. It forms an especially tenacious and voluminous gel. This gel, unlike bentonitic gels, does not readily disperse to a sol, and seems to have a more definite yield-point in the gel form. Also, it contains little or no alumina which might adversely affect the refractoriness of basic materials nor carbon to impose deleterious reducing action or to burn out. Less desirably, I may employ bentonite, starch or other gel-forming materials but they are not as effective.

The substances I have mentioned do not contribute much to the bonding of the gun refractory when it is dried and heated to higher temperatures. Where it is desired an accessory form of bond may also be incorporated in the refractory. I frequently use sodium silicate in aqueous solution in the gauging water for this purpose. The silicate can be used in amounts of three per cent, more or less, by anhydrous weight, of the refractory. The silicate which seems most desirable contains 75 per cent $SiO_2$ and 23 per cent $Na_2O$. I also contemplate the use of dry sodium silicate or other bonding substances, some of which may be incorporated dry into the refractory fines and subsequently set by gauging with water; and I do not, therefore, wish to limit my invention to compositions bonded with accessory sodium silicate, but intend to include chemical bonds in general.

As an example: I screen, from ordinary kiln run, hearth dolomite of the following composition:

| | Per cent |
|---|---|
| $SiO_2$ | 1.0 |
| $Fe_2O_3$ | 6.5 |
| $Al_2O_3$ | 1.5 |
| CaO | 54.0 |
| MgO | 37.0 | in a −10 mesh sizing, without obtaining any of such material by crushing. I pulverize a magnesite clinker composed of:

| | Per cent |
|---|---|
| $SiO_2$ | 4.0 |
| $Fe_2O_3$ | 3.0 |
| $Al_2O_3$ | 2.0 |
| $Cr_2O_3$ | 2.5 |
| MgO | 88.5 | to a −100 mesh sizing and mix intimately, while grinding, with the desired amount of hectorite.

I combine the calcined dolomite, the magnesite clinker and the hectorite in the following proportions:

|   | Per cent |
|---|---|
| −10 mesh calcined dolomite, about | 67 |
| −100 mesh magnesite clinker | 31 |
| −200 mesh commercial hectorite | 2 |

This mixture is of such a character as to be applicable by a pneumatic gun having an air source, a feeder and a tubular body with a discharge nozzle in which a water spray or solution saturates the refractory stream. In general, the gun is on the lines of cement guns which have been known in the cement mortar art. The refractory mixture afore-described is thus fed through such an air gun, incorporating with it a solution of sodium silicate (ratio of $Na_2O:SiO_2$, 1:3.3) in amount to give about 3–4 per cent sodium silicate on water-free basis, the refractory being thereby moistened and simultaneously projected upon the hearth or furnace structure.

Other modes of applying the principle of the invention may be employed, change being made as regards the details described, provided the features stated in any of the following claims, or the equivalent of such, be employed.

I therefore particularly point out and distinctly claim as my invention:

1. A process of lining furnaces, which comprises dry mixing about 67 per cent of −16 mesh calcined dolomite and about 31 per cent of −100 mesh magnesite clinker and about 2 per cent of −200 mesh material capable of swelling to a gel when mixed with water, in the form of the hydrous magnesium silicate composition of hectorite from San Bernardino County, California, and swelling said hectorite by blowing such dry particles into admixture with sodium silicate solution to give about 3–4 per cent sodium silicate on the water-free basis and blowing the particles into position on a furnace surface.

2. A process of lining furnaces, which comprises dry mixing a major proportion of moderately coarsely sized hard-burned dolomite and a minor proportion of fine magnesite clinker and up to about 5 per cent of finely divided material capable of swelling to a gel when mixed with water, in the form of the hydrous magnesium silicate composition of hectorite from San Bernardino County, California, and swelling said hectorite by blowing such dry particles into admixture with sodium silicate solution and blowing the particles into position on a furnace surface.

3. A process of lining metallurgical apparatus, which comprises replenishing a basic refractory lining by mixing particles of basic refractory material and up to about 5 per cent of finely divided material capable of swelling to a gel when mixed with water, in the form of the hydrous magnesium silicate composition of hectorite from San Bernardino County, California, and swelling said gel-forming material by simultaneously admixing water and blowing the mixture into place on a metallurgical apparatus surface to be protected.

4. A process of the character described, which comprises dry mixing a major proportion of moderately coarsely sized hard-burned dolomite and a minor proportion of fine magnesite clinker and a few per cent of finely divided material capable of swelling to a gel when mixed with water, in the form of hydrous magnesium silicate of the composition of hectorite from San Bernardino County, California, and swelling the gel-forming material by blowing such dry particles into admixture with sodium silicate solution and blowing the particles into position on a furnace wall.

5. A process of the character described, which comprises dry mixing graded sized particles proportioned as relatively coarse, not exceeding −10 mesh, and moderate size of basic refractory material from the group consisting of magnesia, dolomite, chrome ore and basic silicates, together with a small per cent of material capable of swelling to a gel when mixed with water, in the form of hydrous magnesium silicate of the composition of hectorite from San Bernardino County, California, and swelling the gel-forming material by blowing such dry particles into admixture with sodium silicate solution and blowing the particles into position on a furnace wall.

6. A process of the character described, which comprises dry mixing graded sized particles proportioned as relatively coarse, not exceeding −10 mesh, and moderate size of basic refractory material, together with a small amount of a material capable of swelling to a gel when mixed with water, in the form of hydrous magnesium silicate of the composition of hectorite from San Bernardino County, California, and swelling said gel-forming material by simultaneously moistening and blowing the particles into place on the metallurgical apparatus surface to be protected.

7. A process of the character described, which comprises mixing particles of burned dolomite and magnesite, together with a minor amount of material capable of swelling to a gel when mixed with water, in the form of hydrous magnesium silicate of the composition of hectorite from San Bernardino County, California, and swelling said gel-forming material by simultaneously moistening and blowing the mixture into place on the metallurgical apparatus surface to be protected.

8. A process of the character described, which comprises mixing particles of basic refractory material and a minor proportion of material capable of swelling to a gel when mixed with water, in the form of hydrous magnesium silicate of the composition of hectorite from San Bernardino County, California, and a dry bonding agent, and swelling said gel-forming material by simultaneously moistening and blowing the dry particles into position on a metallurgical apparatus surface to be protected.

9. A process of the character described, which comprises mixing particles of basic refractory material and a small per cent of material capable of swelling to a gel when mixed with water, in the form of hydrous magnesium silicate of the composition of hectorite from San Bernardino County, California, and swelling said gel-forming material by simultaneously moistening and blowing the mixture into place on the metallurgical apparatus surface to be protected.

ROBERT A. SCHOENLAUB.